Figure 2:
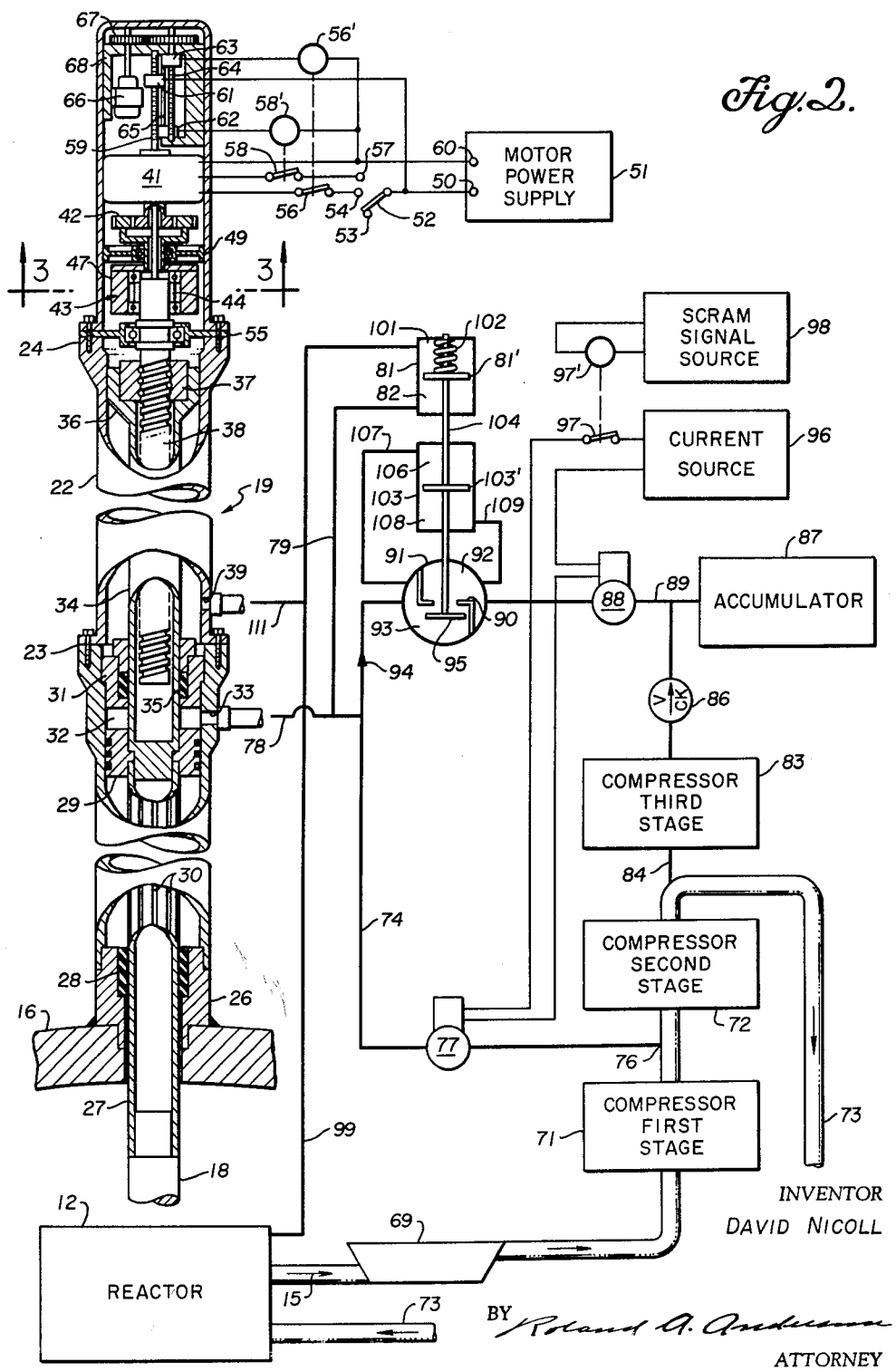

Feb. 23, 1965   D. NICOLL   3,170,844
CONTROL ROD DRIVE MECHANISM
Filed Sept. 19, 1960   2 Sheets-Sheet 1
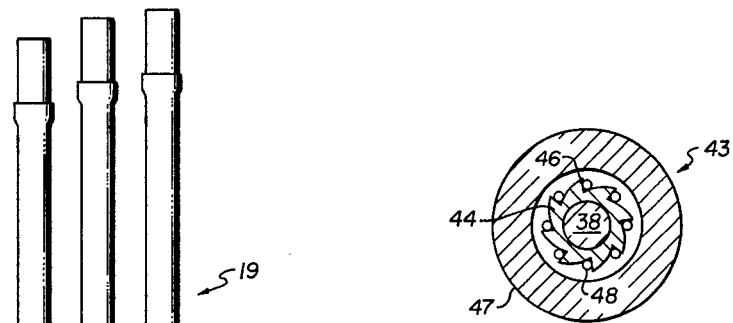
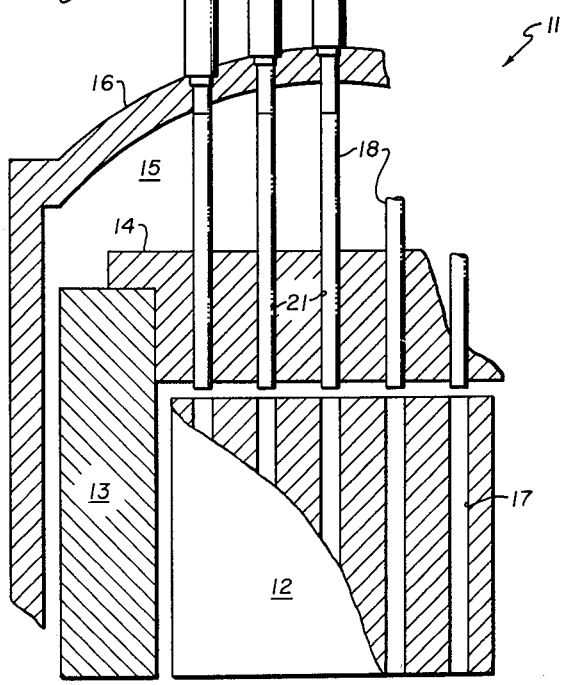
INVENTOR
DAVID NICOLL INVENTOR
DAVID NICOLL
BY Roland A. Anderson
ATTORNEY

United States Patent Office 3,170,844
Patented Feb. 23, 1965

3,170,844
CONTROL ROD DRIVE MECHANISM
David Nicoll, San Diego, Calif., assignor to the United
States of America as represented by the United States
Atomic Energy Commission
Filed Sept. 19, 1960, Ser. No. 57,086
9 Claims. (Cl. 176—36)

The present invention relates to nuclear reactors and more particularly to a mechanism for driving and positioning control rods therein which mechanism is operated by the fluid pressure of the reactor coolant acting in conjunction with electro-mechanical drive means.

To control the reaction rate of an assembly of fissionable material, passages are provided in the assembly and long control rods, formed of a neutron-absorbent material, are positioned therein. Provided proper parameters have been chosen, the assembly, or core, is held below the level of criticality by full insertion of the rods into the passage and the core is made reactive to a desired degree by the controlled withdrawal of the rods a measured amount. In practice, three somewhat distinct functions must be performed by control rods. A first such function is rough control of the reactivity and a second is fine control thereof including very small adjustments to compensate for drifts in reactor conditions as the reactor operates. A third function is known as scram control and consists of rendering the reactor subcritical as rapidly as possible upon the detection of certain forms of malfunction.

The characteristics required by the mechanism for driving the control rods differ somewhat among the above three functions. Thus precision is a foremost consideration in the fine control as compared with the rough control in which the basic objective is to move a much greater mass of control rod material. In the scram function, little or no attention is paid to accurate position control, the prime consideration being reliability and speed. Thus it has been the usual practice to use separate rods for the various functions and to drive the different rods by differently designed mechanisms.

Mechanisms which may be used to insert and withdraw the rods include mechanical linkages such as the threaded screw, and pneumatic or hydraulic drives. Mechanical drives can give high accuracy but tend to be slow. Pneumatic drives, and to a lesser extent hydraulic drives, give high operating speeds but, in the absence of undue complexity, do not offer the same positional accuracy. Thus mechanical systems are more suited to fine control while the fluid systems are adaptable for scram control.

Considering the use of hydraulic or pneumatic drives as heretofore envisioned, it is characteristic of the structure that the control rod, or a drive rod attached thereto and forming a continuation of the control rod, must necessarily penetrate through a sliding seal which separates the driving fluid from the coolant fluid within the reactor itself. This form of drive therefore seemingly precludes constructing the reactor in an asbolutely hermetically sealed design and since any seal may leak somewhat, the possibility of contaminating the reactor core with hydraulic fluid, and of contaminating the fluid with radioactive matter is introduced.

The present invention provides a control rod drive mechanism suitable for accomplishing all three of the above described functions with the same control rod. The invention uses a pneumatic system as a basic drive while an integral and co-functioning electromechanical system provides precise positional control. As a particularly advantageous feature, the reactor coolant fluid itself is used to drive the rod. Thus no additional high pressure fluid system is required and, importantly, the problem of leakage past the seal which separates the drive from the reactor proper is circumvented.

Accordingly, it is an object of this invention to provide a control rod driving mechanism for a nuclear reactor which mechanism is operated in part by electromechanical means and in part by pneumatic means utilizing the reactor fluid as a driving medium.

It is another object of this invention to provide a control rod drive mechanism for a nuclear reactor which mechanism is capable of producing very precise positioning of the control rod in the reactor core.

It is another object of this invention to provide a drive mechanism which is capable of producing very rapid insertion of a control rod into a nuclear reactor core.

It is an object of this invention to provide a fluid pressure operated control rod drive for a nuclear reactor in which problems associated with fluid leakage past the seal between the rod drive system and the reactors are eliminated.

It is a further object of this invention to provide a control rod drive mechanism for a nuclear reactor which mechanism can be contained with the reactor in an hermetically sealed system.

It is a still further object of this invention to provide a fail safe means of automatically operating the control rods of a nuclear reactor.

The invention, both as to its organization and method of operation, together with further objects and advantages thereof, will best be understood by reference to the following specification taken in conjunction with the accompanying drawing of which:

FIGURE 1 is a view showing the physical arrangement of the invention with respect to a nuclear reactor, a simplified portion of which reactor is shown in cross-section, FIGURE 2 is a view showing the mechanical components of the invention in a broken-out section view with the external pneumatic system and electrical components associated therewith shown diagrammatically, and FIGURE 3 is an enlarged view taken along line 3—3 of FIGURE 2.

Referring now to the drawing and more particularly to FIGURE 1 thereof, there is shown a portion of a typical gas-cooled nuclear reactor 11. The reactor core 12 is composed of suitable fissionable material by means of which nuclear energy is generated, suitable materials and structure for such core being well understood within the art. Neutron reflective shielding is disposed around the core 12 of which a side reflector 13 and an upper reflector 14 are shown in the drawing. A reactor pressure vessel 16 encloses the reactor core and the surrounding reflectors to confine the reactor coolant fluid 15 which in this instance is gaseous.

The reactor core 12 is pierced at regular intervals by a plurality of spaced apart vertical channels 17. Each of the channels 17 accommodates the introduction of one of a like plurality of control rods 18 into the core 12. The control rods 18 are composed of a neutron-absorbent material the presence of which material in the core reduces the rate of fission reaction. The energy output of the reactor is regulated by varying the position of the control rods 18 in the core 12. The length of the rods is equal to the height of the core, therefore maximum absorption occurs with the rods fully inserted therein. A plurality of vertical passages 21 are provided in the upper reflector 14 to accommodate the passage of the rods 18 into the channels 17 of the core 12.

The control rods 18 are independently positioned in the core 12 and each is operated by one of a like plurality of electropenumatic driving mechanisms 19, which mechanism are disposed directly above the control rods 18.

Referring now to FIGURE 2, there is shown the driving mechanism 19 for a single control rod of the reactor which mechanism is similar to that of the remaining rods. The mechanism is enclosed by an essentially cylindrical housing 22, mounted atop the reactor pressure vessel cover 16, which housing 22 is formed in three sections fitted together at the bolted flange joints 23 and 24. The cylindrical housing 22 is rigidly secured to the reactor pressure vessel 16 at the base 26 which base is welded to the vessel cover 16. A reciprocable tubular connecting shaft 27 is disposed along the axis of the lower section of the driving mechanism and extends through a passage in the vessel cover 16 through the base 26. Shaft 27 connects with the upper end of the reactor control rod 18 whereby positioning motion may be communicated thereto. Annular packing 28 is disposed within the base 26 in position to encircle the shaft 27.

The upper end of the connecting shaft 27 is secured to the underside of a coaxial piston 29, which piston is mounted in the cylinder housing 22 for reciprocation therein. An annular closure 31 is disposed coaxially in the housing 22 to form a barrier therein and to define the top of a pressure chamber 32 above the piston 29. The closure 31 is disposed at a longitudinal position in the housing 22 to provide the pressure chamber 32 with a length slightly greater than the length of the control rod 18. In this way the full travel of the piston 29, communicated to the control rod 18 by the connecting shaft 27, may completely withdraw and completely insert the control rod 18 in the core 12. A port 33 in the upper chamber wall permits entry of pressure-regulated fluid into the chamber 32 to act on the piston 29, as will hereinafter be more fully described.

The outer surface of the lower connecting shaft 27 is provided with a series of longitudinal slots 30 by means of which slots the reactor coolant gas enters the cylinder housing 22 in order that the reactor pressure will act on the underside of the piston 29. For control rod removal, this pressure on the piston is allowed to force the piston upward and thus helps to raise the control rod 18 as will be described hereinafter. For control rod insertion wherein the piston 29 is driven down from above, the resistance from the reactor fluid being forced back through the slots 30 helps to govern the rate of fall of the control rod 18 and acts as a shock absorber and brake to the motion. To provide an increasing braking force on downward motion of piston 29 during a reactor scram, the slots 30 are of progressively less depth towards the top of shaft 27.

An upper tubular connecting shaft 34 is secured to piston 29 and extends upward therefrom, through the central opening of closure 31, and further upward in the cylinder housing 22. A pressure seal 35 is mounted in the closure 31 coaxially with shaft 34 to prevent leakage from the piston pressure chamber 32 through the closure. The upper end of connecting shaft 34 terminates in an annular flange 36 which flange 36 is slidably fitted within the cylinder housing 22. A ball-screw nut 37 is coaxially mounted within the flange 36 and engages a screw 38 which screw 38 extends along the axis of the tubular shaft 34. Thus upon rotation of the screw 38, the ball-screw nut 37 rides along the length of the screw and, by virtue of the described connections, causes like motion of the upper connecting shaft 34, the piston 29, and the lower connecting shaft 27, whereby the control rod 18 is raised or lowered in the reactor core 12, according to the direction of the screw rotation. As in the aforementioned case of the piston pressure chamber 32, the threaded length of the ball-screw 38 is sufficient to accommodate full travel of the control rod 18 between complete insertion and complete withdrawal from the core. A second port 39 is provided in the cylinder housing 22, above the pressure seal 35, whereby this upper portion of the housing 22 may be pressurized to the reactor pressure as will hereinafter be described.

Rotation of the screw 38 to position the control rod 18 in the core during normal reactor operation is produced by a reversible driving motor 41 disposed coaxially within the cylinder housing 22 above the maximum elevation of flange 36. A planetary gear reduction unit 42 is disposed immediately beneath the motor and is coupled to the shaft thereof to reduce the rotation velocity to be imparted to the screw 38. In order that the screw 38 may be disengaged from the driving motor and gear unit during the pneumatically driven scram movement, the screw is coupled to the planetary gear unit 42 through a free-wheeling clutch 43.

Referring now to FIGURE 3 of the drawing together with FIGURE 2, there is shown a cross-section view of the free wheeling clutch 43 taken along line 3—3 of FIGURE 2. The inner race 44 of the clutch is secured coaxially to the upper end of the screw 38 and the periphery of the inner race is provided with a series of cogs 46 which are each inclined on one face and cut radially on the other. The outer coaxial race of the clutch 43 is an annulus 47 mounting the planetary elements of the gear reduction unit 42. A roller 48 is disposed between each adjacent pair of cogs 46 in parallel relationship with respect to the axis of the clutch.

The pneumatic pressure of the reactor coolant acting on the underside of piston 29 normally acts to rotate screw 38 in a direction which forces rollers 48 to ride outward on the inclined faces of cogs 46 and thus wedge against the outer race 47. Thus so long as such pressure is acting on piston 29, and it is not opposed by a greater pressure at the top of the piston, the clutch effectively couples motor 41 to the screw 38 and the positioning of the control rod 18 is controlled by operation of the motor. However, an excess of pneumatic pressure at the top of piston 29 tends to rotate screw 38 in an opposite sense and rollers 48 move radially upward within the clutch to decouple the screw from the motor 41. As will be later discussed in more detail, the latter pressure condition obtains during a scram operation. Thus by means of clutch 43, the additional inertia of the gear unit 42 and driving motor 41 is removed from the system during a scram condition and the rod insertion speed is maximized.

Referring again to FIGURE 2, a pair of ball bearings 49 and 55 are mounted in the cylinder housing 22 to support and center the planetary gear unit 42 and freewheeling clutch 43, bearing 49 being between the clutch and gear unit and bearing 55 being immediately beneath the clutch.

A power supply 51, to energize the driving motor 41, is disposed external to the cylinder housing 22. A three position switch 52, to control the driving motor is connected to one output terminal 50 of power supply 51 and has a first position 53 to open the motor circuit. A second position terminal 54 of the switch 52 connects the motor 41 with supply 51 through a first relay-operated switch 56, and energizes the motor to withdraw the control rod 18 from the core 12. The third position terminal 57 of the switch 52 connects the reverse terminal of motor 41 with supply 51 through a second relay-operated switch 58 and thus energizes the motor to insert the control rod into the core. The normally closed relay switches 56 and 58 serve to automatically open the motor circuit upon the arrival of the control rod 18 at the fully withdrawn and fully inserted core positions, respectively, and are controlled by mechanism disposed within the upper end of housing 22.

Considering now the detailed structure of such mechanism, a threaded shaft 59, extends upward in the axial direction from screw 38 through axial passages in motor 41, gear unit 42 and clutch 43. A switch contact 61 is threadably engaged on shaft 59 and is restrained from rotating by a guide 65 so that the contact is moved upwardly or downwardly by a rotation of the shaft. A pair of switch contacts 62 and 63 are disposed adjacent shaft 59 and spaced apart to correspond to the limits of travel of the control rod for full insertion and withdrawal, respectively. The lower switch contact 62 is electrically connected to the driver coil 58' of relay switch 58 and the upper microswitch 63 is connected to the driver coil 56' of relay switch 56, which driver coils 56' and 58' are further connected to the power supply 51 at second output terminal 60 thereof. The movable contact 61 is coupled to power supply 51 at first output terminal 50. Thus it can be seen that with the control switch 52 in either of the motor energizing positions, the ball screw 38 is rotated accordingly to move the control rod up or down in the reactor core. This rotation, communicated to the shaft 59, produces a proportionate movement of the movable contact 61 until the contact 61 reaches the appropriate one of the contacts 62 or 63. For control rod insertion, abutment of the movable contact 61 against contact 62 energizes relay coil 58' to open switch 58 and de-couple the driving motor 41 from the power supply 51. Similarly, for control rod removal, abutment of movable contact 61 with contact 63 energizes coil 56' to open switch 56 and again stop the motor action.

It will generally be desired to limit the control rod position to less than complete withdrawal. For this reason, the upper switch contact 63 is mounted to travel on a threaded rod 64, which rod is disposed parallel to shaft 59 and rotatably mounted on a bracket 68. A small motor 66 mounted in the upper end of cylinder housing 22 on bracket 68 may be used to rotate the rod 64 through a pair of intermeshed gear wheels 67. Thus by controlled operation of motor 66 the upper switch 63 may be stationed at any point along the rod 64 to correspond to the desired maximum withdrawal of the control rod 18 in the core 12.

The thermal energy generated within the reactor core 12 heats the reactor coolant fluid 15 and thereby increases the pressure within the reactor pressure vessel 16. The high pressure coolant 15 is delivered to a power turbine 69 through a conduit 73 external to the reactor 11. The turbine 69 thus serves as the mechanical power output and may be used to drive any desired load.

The outlet conduit from the turbine 69 connects with a first stage compressor 71 and a second stage compressor 72 from which compressor 72 the coolant is returned to the reactor 11 through the final section of conduit 73. The reactor coolant fluid is continuously circulated in this way during the reactor operation and useful power is derived therefrom as described, the detailed structure and techniques for obtaining power from the reactor being well understood within the art.

Considering now the pneumatic controls of the invention, a pressure balancing conduit 74 is connected at one end to an outlet 76 in conduit 73 between the first compressor stage 71 and the second compressor stage 72. A first solenoid-operated valve 77 at this end of the line 74 controls admittance of the intermediate pressure reactor fluid into the pressure balancing line 74. A first branch 78 of the line 74 leads to the cylinder housing 22 of the driving mechanism 19 and is connected to the port 33 of the pressure chamber 32. The presence of the reactor fluid at this intermediate pressure in the pressure chamber 32, creating a downward force on the piston 29, serves to partially balance the reactor pressure acting upward thereon and thereby reduces the force against which the driving motor 41 must act to insert the control rod 18 into the core 12 during normal reactor operation. A second branch 79 of the pressure balancing line 74 leads to a differential pressure valve 81, to be hereinafter more fully described.

To provide the high pressure reactor fluid used to drive piston 29 in the reactor scram operation, a portion of the coolant from the outlet of second compressor stage 72 is transmitted to a third compressor stage 83, through a conduit 84 connecting with the conduit 73. In the third compressor 83 the coolant is brought up to a high pressure level required to drive the piston 29, which level substantially exceeds that within the reactor. The output of third compressor 83 is transmitted through a check valve 86 to an accumulator tank 87 in which accumulator the fluid is stored for use in the event of a reactor scram.

Release of the accumulator high pressure coolant is controlled by a second solenoid-operated valve 88 in an outlet line 89 from the accumulator 87. The outlet line 89 connects with a control valve 91 which control valve regulates the rate of delivery of the accumulator gas to the chamber 32 during a scram as will be hereinafter described. The outlet line 89 continues from the control valve 91 to a junction with branch 78 of the pressure balancing line 74 and thus connects with chamber 32 above piston 29. An expansion nozzle 94 to equalize minute pressure variations is provided in the accumulator outlet line 89 at the output of the control valve 91.

The normally closed first solenoid valve 77 in line 74 is electrically connected in series with the normally open second solenoid valve 88. The valves 77 and 88 are energized by a current source 96 and are connectable thereto through a relay switch 97 which relay switch is normally closed and which may be actuated to open by a scram signal source 98. Thus, during normal reactor operation the high pressure fluid is constrained in the accumulator 87 by the closed solenoid valve 88 and the intermediate pressure fluid from the first compressor stage 72 is admitted to the pressure balancing line 74 by the open solenoid valve 77. For the reactor scram operation, a scram signal from the source 98 energizes the relay coil 97' to open relay switch 97 and disconnect the solenoid valves 77 and 88 from the current source 96. The de-energized valves simultaneously reverse positions and the intermediate pressure fluid is blocked by the closed valve 77 while the high pressure fluid from the accumulator 87 is admitted through the opened valve 88, filling the pressure balancing line 74 and piston pressure chamber 32 to drive the control rod 18 into the reactor core 12.

In the reactor scram operation, the rate at which the control rod 18 is inserted in the core is a function of the difference between the propelling pressure from the accumulator 87 acting above the piston 29 and the resistance pressure developed beneath the piston by the reactor fluid thereat. The rate at which the reactor fluid beneath piston 29 escapes into the reactor through the slots 30 in the shaft 27 is inversely related to the reactor pressure in the cylinder housing 22 at the time of the scram. Consequently, at low reactor power output and thus, low reactor pressure, the braking and shock absorber action provided by the resistance pressure is less efficient because of the lower density gas initially present in the cylinder housing 22.

In order to minimize this variation in braking due to variations in the reactor power output requirements it is necessary to regulate the propelling pressure in such a way as to maintain a constant differential between the propelling pressure and the resistance pressure on piston 29 during a scram.

To provide this pressure regulation, the aforementioned pressure differential control valve 91 acts to maintain a constant difference between the pressures appearing above and below the piston 29.

The valve 91 is provided with inlet and outlet chambers 92 and 93 respectively between which an apertured valve seat 90 is disposed. A valve gate 95 is secured to the end of a reciprocable valve stem 104 within outlet chamber 93 and in position to close the seat 90. Considering now the mechanisms which act to control movement of the stem 104, such stem extends through two diaphragm enclosures 81 and 103 respectively. A first movable diaphragm 103' divides enclosure 103 into two chambers 106 and 108, the diaphragm being operatively connected to stem 104 to tend to close seat 90 upon an excess of pressure in chamber 108 relative to chamber 106. A second movable diaphragm 81' divides enclosure 81 into two chambers 82 and 101, the diaphragm 81' being also operatively connected to stem 104 to tend to close seat 90 upon an excess of pressure in chamber 82 relative to chamber 101. A biasing compression spring 102 is disposed within chamber 101 and bears against diaphragm 81' in a direction tending to open seat 90.

First diaphragm 103' serves to eliminate the effect of pressure differentials on the opposite sides of gate 95 and to accomplish this, a conduit 107 connects valve outlet chamber 93 with diaphragm chamber 106 while a conduit 109 connects valve inlet chamber 92 with chamber 108. Provided diaphragm 103' is equal in area to the gate 95, any pressure differential on the latter is nullified by the equal and opposite pressure on the former and the action of valve 91 is thus made independent of the pressure differential across the valve.

Movement of gate 95 to regulate coolant flow through a pressure valve 91 is solely determined by the pressure differential on diaphragm 81'. To establish this differential, a pressure sensing line 99 from the reactor pressure vessel 16 transmits the reactor pressure to diaphragm chamber 101 and the pressure from the piston pressure chamber 32 in housing 22 is transmitted to chamber 82 at the opposite side of diaphragm 81' by a conduit 79. Thus during scram conditions, diaphragm 81' will assume a position determined by the pressure differential between the reactor and chamber 32 and determined by the force of spring 102. Since valve gate 95 is controlled solely by diaphragm 81', the gate will move to maintain the pressure differential across diaphragm 81' at a constant value, which value is determined by the force constant of spring 102. Thus by an appropriate selection of the spring 102, a desired constant pneumatic force on piston 29 can be predetermined for scram operation which force is independent of the reactor pressure level.

A branch conduit 111 from the pressure sensing line 99 is connected to the second port 39 in the cylinder housing 22 whereby the upper volume of the housing 22 is maintained at the reactor pressure. This pressurization effectively balances the force produced by the reactor pressure acting on the control rod.

Considering now the operation of the invention, it should be noted that the reactor pressure on the underside of piston 29 will exceed the intermediate compressor pressure at the top of the piston during normal operation. Thus the connecting shaft 27 and attached control rod 18 will normally experience an upwardly directed net force. Upward motion of the control rod 18 is prevented however by the coupling of screw 38 to drive motor 41 through clutch 43 and planetary gear unit 42 since the inertial resistance of the motor acting through the high torque reduction gear system is too great to be overcome by the upward force on piston 29. In this connection it should be observed that as long as there is an upward force acting on piston 29 the clutch 43 acts effectively as a direct positive coupling between screw 38 and motor 41.

Thus vertical movement of the control rod 18, under normal operating conditions, is dependent upon operation of drive motor 41. Operation of control switch 52 to the first position thereof will actuate motor 41 to retract the control rod. Upon withdrawal of the control rod to a point determined by the selected setting of the contact 63, relay 56 acts to interrupt the current to motor 41 and thus position control of the rods is achieved.

Similarly, if the control switch 52 is set to the second position thereof, motor 41 is actuated in the opposite direction to drive the control rod 18 downwardly, the motor being de-energized by relay 58 when the rods have been fully inserted. To obtain fine control of reactivity during normal operation of the reactor, control switch 52 may be selectively operated to drive the rod 18 in either direction.

Upon an emergency situation in the reactor operation whereupon an immediate shut-down of the reactor is necessary, rapid control rod insertion is initiated by a signal from the scram signal source 98.

The scram signal may be generated by any of various detection instruments which continuously monitor the reactor for indications of abnormal operation, suitable instruments for this purpose being well understood within the art. This signal energizes relay coil 97' to open the relay switch 97. Current source 96 is now disconnected from the two solenoid valves 77 and 88, thereby closing the pressure balancing line 74 and releasing the high pressure gas in the accumulator 87 to the control valve 91. As hereinbefore described, the control valve 91 has been held in the open position and thus the high pressure fluid is immediately admitted through conduit 78 to the pressure chamber 32 above piston 29. The rate of flow of accumulator gas into the pressure chamber 32 is regulated by valve 91 to maintain a constant pressure differential between the region above piston 29 and the reactor. In this way, regardless of the reactor operating pressure at the time of the scram, the control rod 18 will be traveled downwardly at a predetermined rate. This provision prevents the possibility of damage to the mechanism through very high speed positioning as would occur under very low reactor operating pressure.

The force on the piston 29 is transmitted to the nut 37 through upper connecting shaft 34. The downward travel of the nut 37 along the length of the ball-screw 38 forces the rotation of the screw 38 and inner race 44 of clutch 43. The outer race 47 of the clutch is at rest since the driving motor is not energized and under these rotational conditions the clutch 43 disengages and the ball-screw 38 is in free-wheeling rotation. In this way the pneumatic force acting on the piston 29 to produce the rapid motion does not have to overcome the inertia of the electromechanical driving components.

As the connecting shaft 27 passes through the packing 28 at the top the reactor pressure vessel 16, the effective orifice area of the slots 30 in the shaft 27 is continuously reduced owing to the described tapering of the depth of the slots towards the top of shaft 27. The coolant fluid from the reactor entrapped within the housing 22 below the piston 29 is forced through the slots 30 to return to the reactor pressure vessel 16. The compressive force of the piston on this fluid and the continuously decreasing orifice area for the fluid to escape cause an increasing pressure below the piston. The force of this pressure increasingly opposes the downward force on the piston and thus provides increasing braking action to the control rod insertion. The control rod 18 is thereby brought to rest at the fully inserted position in the core 12 without excessive jarring.

Upon the completion of the scram operation, the solenoid valves 77 and 78 may be re-energized whereby the high pressure gas in pressure chamber 32 escapes through pressure balancing line 74 and is returned to the reactor 12 through second stage compressor 72.

In addition to the rapid control rod insertion provided by the pneumatic scram system, further fail-safe features are inherent in the apparatus as herein described. The solenoid valves 77 and 88 in the pressure lines may be arranged to fail-safe upon failure or upon a predetermined low reactor operating pressure whereby the accumulator 87 fluid is always available to scram the control rods.

Thus it can be seen that the control rod driving mechanism of the present invention provides precise normal positioning and rapid emergency insertion by the co-acting electromechanical drive and pneumatic drive. The use of the reactor coolant as the pneumatic fluid permits free interchange of the fluid between the reactor and control rods, eliminating the need for seals between the two mechanisms and eliminating the possibility of contaminating the reactor with foreign fluid.

While the invention has been described with respect to a particular embodiment thereof, it will be apparent to those skilled in the art that numerous variations and modifications are possible within the spirit and scope of the invention and thus it is not intended to limit the invention except as defined in the following claims.

What is claimed is:

1. In a drive mechanism for inserting and retracting a control rod with respect to the core of a nuclear reactor which reactor is of the class enclosed in a pressure vessel and employing a fluid coolant, the combination comprising a reversible electrical motor, a clutch releasably coupling said electrical motor to said control rod to move said rod axially, a fluid driven cylinder having a first end communicated with said vessel and having a fluid inlet at a second end, means coupling said cylinder to said control rod to drive said rod axially into said core upon operation of said cylinder, a compressor receiving coolant from said reactor and compressing said coolant to a pressure higher than that within said vessel, and a valve for selectively transmitting said high pressure fluid from said compressor to said inlet at said second end of said cylinder.

2. In a drive mechanism for positioning a control rod in the core of a nuclear reactor which reactor is of the class enclosed in a pressure vessel and having a fluid coolant therein, the combination comprising a tubular housing having an axial opening at a first end which opening opens into said vessel, said housing having a fluid inlet at a point spaced from said axial opening, a piston slidably disposed within said housing between said inlet and said axial opening thereof, a connecting shaft adapted at one end to couple to a control rod and extending through said axial opening of said housing with the second end coupled to said piston, thereby communicating motion of said piston therein to said control rod, a compressor receiving coolant from said vessel and compressing said coolant to a pressure higher than that within said vessel, a control valve for selectively transmitting high pressure coolant from said compressor to said fluid inlet of said housing, and a high pressure coolant accumulator vessel disposed between said compressor and said control valve and a check valve disposed between said compressor and said accumulator vessel for limiting fluid flow to a direction into said accumulator.

3. In a drive mechanism for positioning a control rod in the core of a nuclear reactor which reactor is of the class enclosed in a pressure vessel and having a fluid coolant therein, the combination comprising a tubular housing having an axial opening at a first end which opening opens into said vessel, said housing having a fluid inlet at a point spaced from said axial opening, a piston slidably disposed within said housing between said inlet and said axial opening thereof, an electrical motor disposed within said housing, a clutch releasably coupling said electrical motor to said piston to travel said piston within said housing, a connecting shaft adapter at one end to couple to a control rod and extending through said axial opening of said housing with the second end coupled to said piston, thereby communicating motion of said piston therein to said control rod, a compressor receiving coolant from said vessel and compressing said coolant to a pressure higher than that within said vessel, and a control valve for selectively transmitting high pressure coolant from said compresser to said fluid inlet of said housing.

4. In control rod positioning apparatus for use with a nuclear reactor of the class enclosed in a pressure vessel and having a coolant fluid circulating therein, the combination comprising a cylindrical housing disposed in axial alignment with said control rod and having a first end opening into said vessel, said housing having a fluid inlet spaced from said first end, a piston movably disposed in said housing between said fluid inlet and said first end thereof, a compressor receiving said coolant from said reactor and compressing said coolant to a pressure higher than that within said vessel, an accumulator storing said high pressure fluid from said compressor, a control valve selectively admitting said high pressure coolant from said accumulator to said fluid inlet to produce rapid translation of said piston in a first direction, a motor, disengageable means coupling said piston with said motor whereby rotation of said motor produces translation of said piston in said first direction and reverse rotation of said motor produces translation of said piston in a second opposite direction, and a connecting shaft axially joined to said piston and said control rod whereby translation of said piston in said first direction effects an inserted control rod position with respect to the core of said reactor and translation of said piston in said second direction effects a removed control rod position with respect to said core.

5. Apparatus as described in claim 4 wherein said disengageable coupling means comprises a screw disposed within said housing, a clutch coupling said screw to said motor for rotation thereby, and a threaded member engaging said screw to be displaced lengthwise thereon upon rotation of said screw, said member extending longitudinally from said screw and terminating in an axial connection with said piston.

6. In a control rod driving mechanism for use with a nuclear reactor of the class having a reactor pressure vessel surrounding a reactor core and a reactor coolant fluid therein, said mechanism comprising a cylinder disposed in vertical alignment with said control rod and mounted above said reactor pressure vessel in fluid tight relationship therewith, said cylinder having a fluid inlet spaced above said vessel a distance at least equal to the length of said control rod, a piston slidably fitted within said cylinder between said fluid inlet and said vessel, a first shaft slidably penetrating said reactor pressure vessel and axially connecting said piston and said control rod, a sealing closure in said cylinder above said fluid inlet, a rotatable screw disposed longitudinally in said cylinder upward from said closure, a nut threadably engaging said screw and travelable along the length of said screw upon rotation thereof, a second shaft fixed at a first end to said nut, said second shaft slideably penetrating said closure and connected to said piston at the second end whereby displacement of said nut is transmitted to said piston, means rotating said screw in a first sense to effect insertion of said control rod with respect to said core, said means rotating said screw in an opposite sense to effect withdrawal of said control rod with respect to said core, a compressor receiving said coolant from said reactor and compressing said coolant to a pressure substantially greater than that of said reactor, a tank storing said high pressure coolant from said compressor, and a control valve selectively admitting said high pressure coolant from said tank to said inlet in said enclosure to effect emergency insertion of said control rod into said core.

7. Apparatus as described in claim 6 wherein said first shaft comprises a tubular member provided with longitudinal slots therein the cross sectional area of which slots decreases toward the end of said shaft joined to said piston for the controlled exchange of said coolant fluid between said pressure vessel and said cylinder below said piston whereby an increasing braking effect is exerted against movement of said piston towards said reactor.

8. Apparatus as described in claim 6 and further comprising a fluid pressure differential sensing means responding to a first pressure level in said reactor vessel and a second pressure level in said cylinder, said sensing means acting on said control valve to maintain a constant differential between said first pressure level and said second pressure level whereby the speed of said emergency insertion of said control rod is independent of said first pressure level.

9. Apparatus for transmitting motion to the control rod of a nuclear reactor the limits of which motion may completely insert or withdraw the length of said control rod from the core of said reactor and which reactor is of the pressurized class having a reactor pressure vessel enclosing the reactor core and a reactor coolant fluid, said apparatus comprising a cylindrical housing disposed in axial alignment with said control rod and externally mounted on said reactor pressure vessel in fluid-tight relationship therewith, said housing having a fluid inlet spaced from said vessel a distance greater than the length of said control rod, a closure in said housing above said fluid inlet, a piston movable in said housing between said inlet and said vessel, a connecting shaft slidably penetrating said pressure vessel and axially joining said piston to said control rod, said shaft provided with longitudinal slots therein for the exchange of said fluid between said reactor pressure vessel and the region of said housing below said piston, a screw having a threaded length at least equal to the length of said control rod, said screw being disposed longitudinally in said housing beyond said closure, a nut threadably engaging said screw to travel lengthwise on said screw upon rotation thereof, a second shaft fixed at one end to said nut, said second shaft sealingly penetrating said lateral closure and terminating in fixed attachment to said piston, a reversible motor disposed in said housing, a reduction gear driven by said motor, a clutch releasably coupling said gear to said screw, a power supply, a selective switch reversibly connecting said motor to said power supply to travel said control rod in said core, a limit switch de-energizing said motor upon a selected limit of travel of said control rod in said core, a compressor compressing said fluid from said vessel to a pressure greater than that in said vessel, a tank receiving said high pressure fluid from said compressor, a control valve having an inlet communicated with said tank and an outlet communicated with said inlet in said housing whereby the opening of said control valve effects rapid travel of said control rod into said core, and a pressure differential sensing mechanism regulating flow through said control valve in accordance with the different between the pressure in said vessel and the pressure in said housing to regulate the speed of said rapid travel of said control rod.

References Cited by the Examiner

UNITED STATES PATENTS

| | | | |
|---|---|---|---|
| 1,437,291 | 11/22 | Corporan | 188—86 |
| 2,855,899 | 10/58 | Beaty. | |
| 2,890,158 | 6/59 | Ohlinger et al. | 176—32 |
| 2,902,885 | 9/59 | Wright. | |
| 2,937,984 | 5/60 | Chapellier | 176—36 |
| 2,957,815 | 10/60 | Pacault et al. | 60—108 |
| 2,975,119 | 3/61 | Emmons | 60—51 |
| 3,018,240 | 1/62 | Bevilacqua | 176—35 |
| 3,038,845 | 6/62 | Johnson et al. | 74—422 |

OTHER REFERENCES

"Chemical Engineers' Handbook," John Perry, McGraw-Hill, 3rd ed., 1950, p. 1320, Fig. 193.

Control of Nuclear Reactors and Power Plants, McGraw-Hill, 1955, by Schultz, pages 98–123.

"Control Engineers' Handbook," Truxal, McGraw-Hill, 1958 ed., chapt. 15, pp. 32 ff.

CARL D. QUARFORTH, *Primary Examiner.*

LEON D. ROSDOL, *Examiner.*